US012812735B2

(12) United States Patent
O'Keefe et al.

(10) Patent No.: US 12,812,735 B2
(45) Date of Patent: Nov. 24, 2026

(54) THICK FILM THERMOPLASTIC INSULATED RESISTIVE HEATING ELEMENT

(71) Applicant: DATEC COATING CORPORATION, Mississauga (CA)

(72) Inventors: William Kevin O'Keefe, Georgetown (CA); Erika Natalia Remolina Galvis, Mississauga (CA); Robert Jakusik, Mississauga (CA); Venancio Patnubay, Brampton (CA)

(73) Assignee: DATEC COATING TECHNOLOGIES LTD., Mississauga (CA)

( * ) Notice: Subject to any disclaimer, the term of this patent is extended or adjusted under 35 U.S.C. 154(b) by 936 days.

(21) Appl. No.: 18/012,402

(22) PCT Filed: Jun. 22, 2021

(86) PCT No.: PCT/CA2021/050856
§ 371 (c)(1),
(2) Date: Dec. 22, 2022

(87) PCT Pub. No.: WO2021/258200
PCT Pub. Date: Dec. 30, 2021

(65) Prior Publication Data

US 2023/0262846 A1 Aug. 17, 2023

Related U.S. Application Data

(60) Provisional application No. 63/043,293, filed on Jun. 24, 2020.

(51) Int. Cl.
*H05B 3/28* (2006.01)
*B41F 15/00* (2006.01)

(52) U.S. Cl.
CPC .............. *H05B 3/286* (2013.01); *B41F 15/00* (2013.01); *H05B 2203/013* (2013.01)

(58) Field of Classification Search
CPC .. H05B 3/286; H05B 2203/013; H05B 3/265; H05B 2203/028; H05B 2203/011;
(Continued)

(56) References Cited

U.S. PATENT DOCUMENTS 8,653,423 B2 2/2014 Olding et al.
2007/0108490 A1 5/2007 Tan et al.
(Continued)

FOREIGN PATENT DOCUMENTS

EP 3457813 A1 3/2019

OTHER PUBLICATIONS

The International Search Report for PCT/CA2021/050856 dated Aug. 23, 2021, 3 pages.

*Primary Examiner* — Phuong T Nguyen
(74) *Attorney, Agent, or Firm* — HILL & SCHUMACHER

(57) ABSTRACT

A thick film high temperature thermoplastic insulated resistive heating element including one or more base dielectric layers screen printed on a metal substrate having a composition one or more melt-flowable thermoplastic polymers, inorganic filler particles, a transition dielectric layer on top of the uppermost based dielectric layer containing inorganic additives in addition to one or more melt-flowable thermoplastic polymers and inorganic filler particles. A heater layer is coated on top of the top dielectric layer where the topmost dielectric layer acts as a transition layer between the uppermost dielectric to protect the adjacent resistor layer from the development of hot spots and cracking arising from the propagation of microcracks due to, amongst other things, residual stresses transmitted to the resistive layer from the
(Continued)

sub-layers due to the thermal history of the resistive heater and substrate. The topmost transition dielectric layer is comprised of a ternary or higher mixture of the thermoplastic material such as, but not limited to, polyether ether ketone (PEEK), the inorganic filler such as alumina and other additives such as aluminum nitride.

39 Claims, 3 Drawing Sheets
(2 of 3 Drawing Sheet(s) Filed in Color)

(58) Field of Classification Search
CPC ................ H05B 2203/017; H05B 3/26; H05B 2203/005; H05B 3/283; H05B 3/14; H05B 3/30; H05B 3/262; H05B 2203/02; H05B 3/445; B41F 15/00
USPC ....... 219/201, 202, 213, 482, 510, 532, 539, 219/541, 542, 543, 552
See application file for complete search history.

(56) References Cited

U.S. PATENT DOCUMENTS

| | | | | |
|---|---|---|---|---|
| 2008/0166563 | A1 | 7/2008 | Brittingham et al. | |
| 2009/0272731 | A1* | 11/2009 | Olding | C08L 71/00 427/58 |
| 2012/0247641 | A1* | 10/2012 | Ruggiero | B32B 27/20 156/60 |
| 2014/0080951 | A1 | 3/2014 | Raman et al. | |
| 2016/0122502 | A1 | 5/2016 | Uibel et al. | |
| 2018/0230290 | A1 | 8/2018 | Saga et al. | |
| 2019/0136109 | A1 | 5/2019 | Agapov et al. | |
| 2019/0166653 | A1 | 5/2019 | Kohl et al. | |
| 2020/0187307 | A1* | 6/2020 | Pizzi | H05B 3/03 |

* cited by examiner

THICK FILM THERMOPLASTIC INSULATED RESISTIVE HEATING ELEMENT

FIELD

The invention relates to a protective, dielectric layer within a thick film high temperature thermoplastic insulated resistive heating element deposited on a metal heater substrate. In another aspect of the invention relates to the construction of the thick film heating element on a metal heater substrate. Other aspects of the invention will become apparent to those of skill in the art upon review of the present specification.

BACKGROUND

Thick film heaters are generally known in the art. These heaters are typically comprised of a substrate material, such as a metal substrate such as an aluminum alloy or steel or a ceramic such as mica or glass, upon which electrically insulative layers of dielectric materials are deposited, typically by either spray coating or screen printing and the deposited layers are subsequently cured in an oven under oxidative conditions. Electric heating circuits, including resistor and conductor traces, can be subsequently deposited on top of the dielectric layers in a similar manner. The resistor is typically comprised of an insulative ceramic matrix, with a continuous network of conductive particles encapsulated within the ceramic film, which allows the conduction of electricity.

The dielectric layers are often comprised of a glass enamel, such as those offered by Dupont and, Ferro and Heraeus Inc. However, these dielectric materials must be fired at high temperature greater than 800° C., which is problematic for aluminum alloys for example, which have low melting points less than 660° C. Olding and Ruggiero [1,2] describe a thick film high temperature thermoplastic insulated heating element, wherein at least one (1) or more dielectric layers comprised of a thermoplastic film with inorganic reinforcing filler particles, are deposited onto a metal substrate. The conductive and resistive traces are deposited on top of the dielectric layer. The thermoplastic dielectric material is advantageous as it has a high thermal coefficient of expansion (CTE), typically ranging from 22-26 ppm/K, which when engineered with the inorganic filler, can match the thermal expansion of the aluminum alloy during processing, thus minimizing residual stresses during thermal processing.

The thermoplastic insulative base dielectric layers described in the invention of Olding and Ruggiero [1,2] provides good CTE matching with the aluminum alloy substrate. However, these base dielectric layers do not afford good CTE matching with the resistor layer, which is comprised of graphite and ceramic binder. To address this issue, Olding and Ruggerio [1,2] prescribe the use of a top dielectric layer which is comprised of the same thermoplastic and ceramic materials, however is much more concentrated in the ceramic material and less concentrated in the thermoplastic material, thus providing a transition layer that is compatible both chemically and mechanically with both the base dielectric film and the resistor layer. Olding and Ruggiero teach that CTE matching with the resistor layer can be achieved by increasing the ratio of the alumina to the thermoplastic material. However, this invention was developed for products whereby the coating was deposited using spray technology and the substrates were relatively thin, thereby allowing the release of stresses in the film after coating deposition, enabled by slight deflection of the thin substrate.

In the course of developing a screen printable version of this assembly deposited onto a relatively thick and rigid aluminum alloy substrate, it was found by the present inventors, that in the absence of a top dielectric layer, significant cracking of the resistor layer occurred in samples immediately after production. When energized, these micro-cracks result in hot spots that cause unacceptable and rapid failure of the heater. Thermal imaging of the heater to detect these hot spots is a standard quality assurance technique. Those parts exhibiting such cracks or hot spots cannot be sold for commercial use.

Significantly, the present inventors found that when following the guidance in Olding and Ruggerio [1,2] to implement a screen printable version of the top dielectric material onto a thick and rigid aluminum substrate, that the top dielectric layer did not resolve the issue of microcracking in the resistor layer nor did the sprayable version of the top dielectric material when included in the construction and deposited using spray technology. Moreover, further maximizing the alumina content beyond a critical concentration in the top dielectric, resulted in significantly reduced adhesion of the conductor trace with the top dielectric layer. The use of AlN as a filler for the dielectric layers, including the top dielectric layer is notably absent from the list of suitable ceramics described in Olding and Ruggerio [1,2].

Dielectric breakdown is not the reason the microcracking and hot spots form on the resistor layer. If this were the case, then the use of an engineered top dielectric would not have been required and would not have provided the best solution for this problem. In fact, the case illustrated in Example 1 herein, which had only the screen printable base dielectric would have given the best result as its formulation has the highest mass fraction of polyether ether ketone (PEEK) and therefore yields the dielectric film with the greatest dielectric strength. In fact, it is found experimentally that this gives the worst results. The screen printable top dielectric (SPTD) layer disclosed herein, containing inorganic filler and greater porosity, has much diminished dielectric strength compared to the screen printable base dielectric (SPBD) layers, but was found to effectively solve the problem of microcracking.

SUMMARY

The present disclosure is directed to resolve the microcracking issue which leads to hot spots and renders the heater device ineffective as well as providing an effective top dielectric layer to prevent the formation of microcracking while ensuring acceptable adhesion of the conductor trace. The present inventors unexpectedly found experimentally that the microcracking issue could be very effectively resolved through a ternary formulation of the top dielectric layer which includes aluminum nitride (AlN), alumina and the PEEK combined in preselected proportions. This top dielectric film did not provide the best match with these CTE of the resistor layer, nor did the formulation maximize either the amount of AlN or the alumina filler to maximize either the thermal conductivity or the mechanical strength. Regardless, the new top dielectric formulation completely prevented the formation of cracking resulting in superior performance in reliability testing in that no detectable cracks were observed.

Accordingly, the present disclosure provides a protective, screen printable, thick film top dielectric layer for use within a construction comprising a thick film high temperature thermoplastic insulated resistive heating element deposited on a metal heater substrate such as, but not limited to, an aluminum alloy as illustrated in FIG. 1.

Thick film resistive heaters on metal substrates involves deposition of a plurality of dielectric layers to provide electrical insulation of the substrate for the subsequent deposition of circuit elements including conductor and resistor traces. The present inventors have discovered a significant improvement on the disclosure of Olding and Ruggerio [1,2], which teaches that a top dielectric layer, can be formulated differently than the other dielectric layers, in order to better match thermal coefficient of expansion between the resistor layer and top dielectric layer. The present inventors found that the approach taught by Olding and Ruggerio [1,2] using an optimized sprayed top dielectric coating did not satisfactorily resolve the microcracking issue observed in the resistor, although it marginally improved the result. In particular, the present inventors unexpectedly discovered through the course of experimentation that a ternary mixture of a screen printable form of the top dielectric formulation, which included additives in addition to the inorganic filler ($Al_2O_3$) and the thermoplastic (PEEK), and when combined in certain proportions, effectively resolved the problem of microcracking in the resistor layer.

The present inventors found that increasing the concentration of $Al_2O_3$ and reducing the proportion of PEEK to improve the hardness and better match the CTE of the top dielectric layer with the resistor layer ultimately resulted in poor adhesion of the conductor trace and did not solve the cracking issue. Experiments were conducted whereby AlN was added to improve chemical compatibility with the conductor trace while increasing the hardness of the top dielectric layer and to explore the hypothesis that AlN in the top dielectric layer may improve the thermal uniformity in the adjacent resistor layer when energized. Although the addition of AlN to the top dielectric layer only marginally affects the thermal uniformity of the resistor layer when the heater was energized, significantly, the inventors unexpectedly discovered that AlN when in certain proportions with PEEK and $Al_2O_3$, was found to completely solve the microcracking issue for the number of thermal cycles studied, thereby ensuring a robust resistive heater product.

However, AlN is not commonly used as a reinforcing agent and the resolution of the microcracking problem via the addition of AlN was a serendipitous observation, which was not certain a priori. Moreover, contrary to expectation from the teaching from Olding et al [1], the screen printable top dielectric formulation which gave the best result did not have the closest CTE match with the resistor layer, nor did it have the highest mass fraction of either the alumina or the aluminum nitride. Rather, the highly desirable result was observed for an optimal condition where the relative proportion of the ingredients were carefully balanced.

While not wishing to be bound by any particular theory or mode of action, it is believed that the precise combination of the thermoplastic material, the alumina and the aluminum nitride in the top dielectric layer afforded a unique balance of the mechanical properties of the top dielectric layer, including fracture toughness and capacity for thermal management to remove and re-distribute heat from the resistor layer, while affording good chemical compatibility with the base dielectric layers below it and the resistor layer above it. Therefore, the top dielectric layer acted as an effective buffer layer that managed residual stressed induced from the thermal history of the metal substrate and dielectric layers below it, while protecting the resistor layer from experiencing these stresses, thereby mitigating crack propagation in the resistor layer.

Microcracking and hotspot formation in the resistor layer of thick film heaters is known to be most pronounced on thick aluminum substrates. In this case, the top dielectric layer was developed for battery electric vehicle high voltage heater application, whereby the heater circuits are screen printed directly onto the aluminum alloy substrate. However, it is known that microcracking can be observed in other metal heater products. Therefore, the top dielectric formulation is expected to be useful and utilized more broadly in various products and applications, where screen printing solutions are required on heated metal substrates.

Thus, the present disclosure provides a thick film thermoplastic insulated resistive heating element, comprising a metallic substrate upon which one or more base dielectric layers are located and a topmost dielectric layer located on an uppermost base dielectric layer of the on or more base dielectric layers to produce a multilayer dielectric film. The one or more base dielectric layers comprise a combination of one or more melt flowable high temperature thermoplastic polymers, and inorganic filler particles, with the one or more melt flowable high temperature thermoplastic polymers being present in a range from about 25% to about 99.9% and the inorganic filler particles present in a range from about 0.10 to about 75 wt. %. A resistor layer is located on top of the topmost dielectric layer and spaced apart electrical traces located on top of the resistor layer are used to connect a power source between the resistor layer and the metallic substrate to apply power to the resistive layer. The topmost dielectric layer is formulated as a transition layer between the underlying one or more base dielectric layers to mitigate or obviate microcracking in the resistor layer. The topmost dielectric layer is comprised inorganic filler particles present in a range from about 15 to about 85 wt. % and melt flowable high temperature thermoplastic polymer present in a range from about 15 to about 85 wt. %, and inorganic additive particles present in a range from about 0.50 to about 50 wt. %.

The inorganic additive particles may be any one or combination of aluminum nitride (AlN), boron nitride (BN), titanium nitride (TiN), silicon nitride ($Si_3N_4$), aluminum oxynitride and any combination thereof.

The one or more melt flowable high temperature thermoplastic polymers in the dielectric base layers and in the topmost dielectric layer may be any one or more of polyetheretherkeotone (PEEK), polyphenylene sulfide (PPS), polyphthalamide (PPA), polyarylamide (PARA), liquid crystal polymer polysulfone (PS), polyethersulfone (PES), polyphenylsulfone (PPSU), polyamide-imide (PAI), self-reinforced polyphenylene (SRP) and any combination thereof.

The inorganic filler particles may be any one or combination of alumina, silica, zirconia, titania, ceria, mica, glass flakes and any combination thereof and may have a flake like or plate like aspect ratio or acicular or rod like crystal habit.

The melt flowable high temperature thermoplastic polymer in the topmost dielectric layer may be polyether ether ketone, the inorganic additive particles may be aluminum nitride and the inorganic filler particles may be alumina particles. The topmost dielectric layer comprises the alumina particles present in a range from about 50 to about 70 wt. %, the polyether ether ketone present in a range from about 25 to about 35 wt. %, and the inorganic additive particles are aluminum nitride particles present in a range from about 1 to about 20 wt. %.

The topmost dielectric layer may comprise the alumina particles present in an amount of about 58.5 wt. %, the melt flowable high temperature thermoplastic polymer being polyether ether ketone may be present in an amount of about 31.5 wt. %, and the aluminum nitride particles may be present in an amount of about 10 wt. %.

The one or more melt flowable high temperature thermoplastic polymers in the one or more base dielectric layers may be a combination of polyether ether ketone and polyamide-imide, the inorganic filler particles may be alumina particles, and the one or more base dielectric layers may comprise the polyether ether ketone present in a range from about 30 to about 99.9 wt. %, the polyamide-imide present in a range from about 0.01 to about 2 wt. % and the remainder being alumina particles to make up to 100%.

The one or more melt flowable high temperature thermoplastic polymers in the one or more base dielectric layers may be a combination of polyether ether ketone and polyamide-imide, the inorganic filler particles may be alumina particles, where the one or more base dielectric layers may comprise the polyether ether ketone is present in a range from about 30 to about 99.9 wt. %, the polyamide-imide present in a range from about 0.01 to about 2 wt. % and the alumina particles present in a range from about 0.10 to about 75 wt %.

The one or more melt flowable high temperature thermoplastic polymers in the one or more base dielectric layers may be a combination of polyether ether ketone and polyamide-imide, and the inorganic filler particles may be alumina particles with the polyether ether ketone present in a range from about 50 to 95 wt. %, and wherein the polyamide-imide present in a range from about 0.13 to about 1 wt. %, and the remainder being the alumina particles.

The one or more melt flowable high temperature thermoplastic polymers in the one or more base dielectric layers may be a combination of polyether ether ketone and polyamide-imide and the inorganic filler particles may be alumina particles with the melt flowable high temperature thermoplastic polymer being present in a range from about 50 to 95 wt. %, the polyamide-imide present in a range from about 0.13 to about 1 wt. %, and the %, and the remainder being the alumina particles to make up 100%.

The one or more melt flowable high temperature thermoplastic polymers in the one or more base dielectric layers may be a combination of polyether ether ketone and polyamide-imide, and the inorganic filler may be alumina, and wherein the one or more base dielectric layers may comprise the polyether ether ketone present in a range from about 80 to 90 about wt. %, the polyamide-imide present in a range from about 0.2 to about 0.6 wt. %, and the alumina present in a range from about 10 to about 15 wt. %.

The one or more melt flowable high temperature thermoplastic polymers in the one or more base dielectric layers may be a combination of polyether ether ketone and polyamide-imide, and the inorganic filler may be alumina, and the one or more base dielectric layers may comprise the polyether ether ketone present in a range from about 80 to 90 about wt. %, the polyamide-imide may be present in a range from about 0.2 to about 0.6 wt. %, and the alumina may be present in a range from about 10 to about 15 wt. %.

The inorganic filler may be α-alumina or gamma alumina.

The thick film thermoplastic insulated resistive heating element may further comprise a protective top coat located on top of the resistor layer.

The protective top coat layer may have a composition substantially the same as the topmost dielectric layer.

The surfaces of the inorganic fillers may be functionalized or otherwise derivatized to improve the cohesiveness of the resulting layer.

The resistive heater layer may be an electrically resistive lead-free thick film made from a sol-gel composite.

Thus, present disclosure provides a thick film thermoplastic insulated resistive heating element that comprises a metallic substrate upon which one or more base dielectric layers are located and a topmost dielectric layer located on an uppermost base dielectric layer of the on or more base dielectric layers to produce a multilayer dielectric film. The one or more base dielectric layers may comprise a combination of polyether ether ketone, polyamide-imide and alumina particles, the polyether ether ketone being present in a range from about 30 to about 99.9 wt. %, the polyamide-imide being present in a range from about 0.01 to about 2 wt. %, and the alumina particles are present in a range from about 0.1 to about 75 wt. %. A resistor layer is located on top of the topmost dielectric layer and spaced apart electrical traces are located on top of the resistor layer to allow a power source to be connected between the resistor layer and the metallic substrate to apply power to the resistive layer which is the heating element in the final device. The topmost dielectric layer is specially formulated to act as a transition layer between the resistor layer and the uppermost base dielectric layer in order to mitigate or obviate microcracking in the resistor layer, and includes alumina particles present in a range from about to about 85 wt. %, polyether ether ketone present in a range from about 15 to about 85 wt. %, and aluminum nitride particles present in a range from about 0.50 to about 50 wt. %.

The topmost dielectric layer may include the alumina particles present in a range from about 50 to about 70 wt. %, the polyether ether ketone present in a range from about 20 to about 40 wt. %, and the aluminum nitride particles present in a range from about 1 to about 20 wt. %.

The topmost dielectric layer may include the alumina particles are present in a range from about alumina ranges from 55 to 60 wt. %, the polyether ether ketone present in a range from about 25 to about 35 wt. %, and the aluminum nitride particles present in a range from about 5 to about 15 wt. %.

The top most dielectric layer may include the alumina particles present in an amount of about 58.5 wt. %, the polyether ether ketone present in an amount of about 31.5 wt. %, and the aluminum nitride particles present in an amount of about 10 wt. %.

The alumina particles may be α-alumina particles or gamma alumina particles.

The alumina particles may have any one or combination of a flake like aspect ratio, plate like aspect ratio, acicular crystal habit and rod like crystal habit.

The thick film thermoplastic insulated resistive heating element may further comprise a protective top coat located on top of the resistor layer and the protective top coat layer may have a composition substantially the same as the topmost dielectric layer located directly under the resistor layer.

The surfaces of the inorganic filler particles in general, and the alumina particles in particular may functionalized or otherwise derivatized to improve the cohesiveness of the resulting dielectric layer.

The resistive heater layer may be an electrically resistive lead-free thick film made from a sol-gel composite.

The inorganic additives in general, and the aluminum nitride particles in particular may have a size generally less than about 10 micrometers.

The inorganic filler particles in general, and the alumina particles in particular may have a mean size in a range from about 5 μm to about 20 μm.

The metallic substrate may be any one of aluminum, stainless steel and low carbon steel.

All the dielectric base layers may be screen printed onto the metal substrate using precursor formulations containing the alumina particles, the polyether ether ketone and the polyamide-imide. The topmost dielectric layer may be screen printed onto the metal substrate using precursor formulations containing the alumina particles, the aluminum nitride particles and the polyether ether ketone, with all of the precursor formulations being formulated to be screen printed.

These formulations may be formulated to be screen printed by including viscosity enhancers, non-limiting examples being any one or combination of ethyl cellulose, methyl cellulose and propyl.

A further understanding of the functional and advantageous aspects of the present disclosure can be realized by reference to the following detailed description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will now be described, by way of example only, with reference to the accompanying drawings, in which.

DETAILED DESCRIPTION

Figure 1:
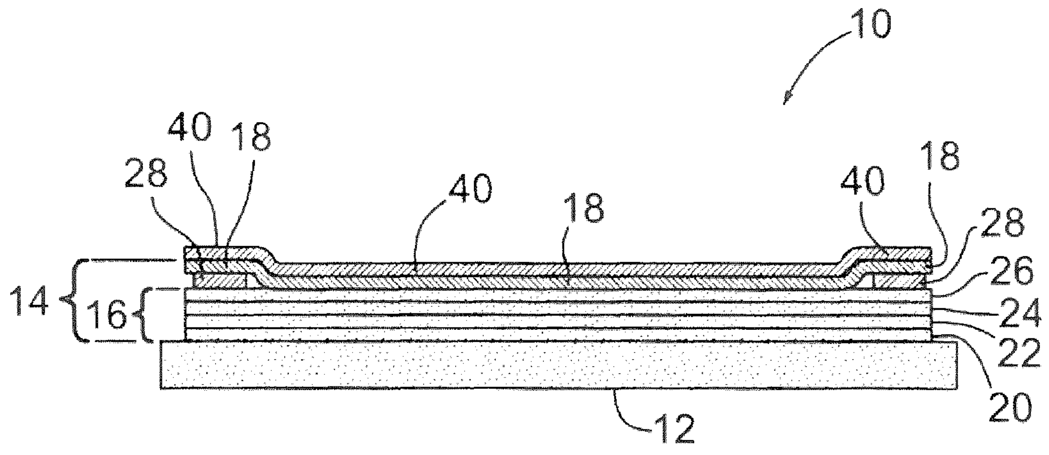
FIG. 1 is a cross section showing the layers of an embodiment of a screen-printed thick film metal heater with protective top dielectric layer constructed according to the present disclosure.

Various embodiments and aspects of the screen-printed thick film metal heater with protective top dielectric layer disclosed herein will be described with reference to details discussed below. The following description and drawings are illustrative of the disclosure and are not to be construed as limiting the disclosure. The figures are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, the terms "generally" and "essentially" are meant to refer to the general overall physical and geometric appearance of a feature and should not be construed as preferred or advantageous over other configurations disclosed herein.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As used herein, the phrase "screen printable formulation" or "screen printing" refers to a process of producing a layer of material by depositing the paste in the form of a film onto a substrate by forcing the paste through a screen using a squeegee to give a pre-determined pattern or trace on the substrate due to the characteristic of the patterned screen whereby open mesh apertures allow paste to pass through the screen to the substrate while transfer of the paste to the substrate is denied in other areas where the openings are blocked. The film is subsequently dried and then cured by firing in an oven. In contrast to spraying, the viscosity of a screen printable paste is typically much higher than used in spray processes and typically includes viscosity enhancers such as ethyl cellulose.

As used herein, the phrase "spraying" or "sprayable formulation" refers to a process of producing a layer of material by depositing the material onto a substrate by utilizing a spray nozzle to atomize the paste and force the solid particles towards the substrate; the solid particles which are typically less than 50 μm undergo plastic deformation, collide with and adhere to the substrate. The film is subsequently dried and fired in an oven to cure the film.

The main advantages of screen printing over spray coating include cleanliness during manufacture (no overspray associated with sprays) and better process economics associated with its low cost, efficiency and high throughput.

The present disclosure is focused on a problem associated with producing polymer based dielectric layers required in the production of thick film heaters on metal substrates. U.S. Pat. No. 8,653,423 B2 "Thick Film High Temperature Thermoplastic Insulated Heating Element" to Olding and Ruggiero (Olding et al.) teaches the construction and use of thick film high temperature thermoplastic heaters which includes a composite top dielectric layer including a melt-flowable thermoplastic polymer in combination with an inorganic filler. In particular, it discloses a binary mixture of the thermoplastic (PEEK) and a single inorganic filler ($Al_2O_3$), whereby coefficient of thermal expansion (CTE) matching was achieved by adjusting their relative proportions. It was believed that microcracking and hot spots could be avoided by the attainment of optimal (CTE) matching. This Olding et al. patent explicitly teaches that formulating the top dielectric layer with an increased ratio of inorganic filler to polymer, in order to better match the coefficient of thermal expansion (CTE) with the resistor layer exhibits considerable efficacy with respect preventing microcracks and hotspots when coated on relatively thin (<1 mm) and flexible aluminum substrates.

As noted above a drawback to this reference is that it is only suitable for relatively thin aluminum substrates and when applied to thick and rigid aluminum substrates, such as 3000 series aluminum heat exchanger substrates for battery electric vehicle applications in excess of 3 mm in thickness, the dielectric material as taught in the Olding patent resulted in micro-cracking leading to hot spots and poor thermal uniformity resulting in defective parts not suitable for commercial sale. It is believed that rigidity of the thick substrates is problematic, which is often associated with its thickness. Thin substrates can bend or deflect slightly after films are cured, which relieves stresses in the films. Rigid substrate (thicker substrates) will deflect significantly less and the stresses in the film result in microcracking and hot spots.

While the sprayable top dielectric formulation as taught by Olding et al. was found to significantly improve the issue of microcracking on thin metal substrates, it did not resolve the problem satisfactorily. Similarly, a screen-printed top dielectric whose formulation was based on the sprayable top dielectric, yielded a similar outcome.

Studies carried out by the inventors showed that micro-cracking of the resistor layer occurred as a result of residual stresses in the material due to a combination of the processing of multiple film layers. In particular, thick aluminum substrates may expand broadly during thermal processing whereby films are cured but may remain very rigid when cooled at room temperature, not allowing relief to the residual stress within the deposited layers. Micro-cracks in the resistor layer result in hot spot formation when the resistive heater is energized upon being connected to the power supply, which ultimately results in device failure in a relative short timeframe compared to its expected or desired operating life.

Another drawback to the solution provided by Olding et al. relates to the method of application of the dielectric layer, which was by spray deposition which results in significant waste and increased cost. A more in contrast to screen printing of a dielectric. It would be very advantageous to provide a formulation that is screen-printable which can be applied more precisely than by spray deposition, and at much lower cost.

The top dielectric coating or layer disclosed herein solves this problem and provides a robust solution to this problem as it provides a screen-printable topcoat dielectric formulation that can be used in both thin and thick substrate heater applications in order to enhance the product life expectancy of the thick film high temperature thermoplastic heaters. The inventors have discovered that the use of a ternary formulation of a screen printable top dielectric, containing aluminum nitride (AlN) was surprisingly able to solve the issue of micro-cracking and improve thermal uniformity. In particular AlN was used as an additive, and studies were carried out to discover the ranges of each of the three constituents, melt-flowable thermoplastic polymer, inorganic additive and inorganic filler. To the best of the inventors' knowledge, this is the first screen-printable top dielectric material involving a ternary or higher mixture of constituents developed for use in high temperature metal heaters involving thermoplastic dielectric materials that has effectively solved the issue of microcracking in the resistor layer.

FIG. 1 illustrates a schematic representation of a thick film thermoplastic insulated resistive heating element comprised of a metallic substrate (12) upon which one or more dielectric layers (20, 22, 24, 26) are deposited to create a multilayer dielectric substrate (16) and a resistive layer (18) is located on top of the uppermost dielectric layer (26). While in a preferred embodiment, conductor traces (28) are printed on top of the top dielectric layer (26) as shown along opposed edges of the layer (26) with the resistor layer (18) being printed over both the conductive traces (28) and the top dielectric layer (26). A protective top coat (40) can optionally be deposited on top of the assembly covering the resistor layer (18). While the conductive traces (18) are preferably on top of the top dielectric layer (26), it will be appreciated that the resistor layer (18) may be deposited directly on the top dielectric layer (26) and then the conductive traces (28) deposited on top of the resistive layer (26).

Top most dielectric layer (26) is specially formulated as a transition layer between the base dielectric layers (20, 22, 24) and the resistor layer (18) and to mitigate or obviate microcracking in the resistor layer (18) in accordance with the present disclosure. Top dielectric layer (26) generally will have a composition different from the underlying base dielectric layers (20, 22, 24) while these base dielectric layers (20, 22, 24) may have the same composition, however the composition between dielectric layers (20, 22, 24) may differ from each other.

As shown in FIG. 1 protective top coat (40) may be deposited to protect the underlying layers and in a preferred embodiment this layer may be identical to the top dielectric layer (26) so that resistive layer (18) is sandwiched between layers of the same composition. Using the dielectric formulation of protective top (26) as a finish coat may provide the advantage of imparting the required mechanical protection to the resistor layer (18), while also maintaining a proven chemical, thermal and mechanical compatibility with the resistor layer (18). More generally, the dielectric formulation of top layer (26) gives good mechanical, thermal and chemical compatibility with the thick film heater system (10).

The resistive layer (18) is preferably a lead-free composite sol gel resistive thick layer which may be made according to the teachings of U.S. Pat. No. 6,736,997 issued on May 18, 2004 and U.S. Pat. No. 7,459,104 issued Dec. 2, 2008 both to Olding et al., (which are both incorporated herein in their entirety by reference) and the resistive powder can be one or graphite, silver, nickel, doped tin oxide or any other suitable resistive material, as described in the Olding patent publication.

The sol gel formulation is a solution containing reactive metal organic or metal salt sol gel precursors that are thermally processed to form a ceramic material such as alumina, silica, zirconia, (optionally ceria stabilized zirconia or yttria stabilized zirconia), titania, calcium zirconate, silicon carbide, titanium nitride, nickel zinc ferrite, calcium hydroxyapatite and any combinations thereof. or combinations thereof. The sol gel process involves the preparation of a stable liquid solution or "sol" containing inorganic metal salts or metal organic compounds such as metal alkoxides. The sol is then deposited on a substrate material and undergoes a transition to form a solid gel phase. With further drying and firing at elevated temperatures, the "gel" is converted into a ceramic coating. The sol gel formulation may be an organometallic solution or a salt solution. The sol gel formulation may be an aqueous solution, an organic solution or mixtures thereof. Resistor layers (18) with different chemical compositions may have different preferred formulations of the top dielectric layer.

A preferred way of depositing these dielectric layers (20, 22, 24, 26) is screen printing and resistive layer (18) which can be limiting in respect of how thick the layers can be deposited and hence for when screen printing is used, multiple base dielectric layers such as layers (20, 22 and 24) may be screen printed depending on the application of the final heater device (10) which will determine how thick the multilayer dielectric substrate (16) needs to be. Since the base dielectric layers (20, 22 and 24) may all have the same composition, it will be appreciated that for some heater applications a thin dielectric substrate (16) is all that is needed so that only one base layer (22) needs to be present and thus only one is screen printed while when a thicker dielectric substrate (16) is more appropriate, multiple dielectric layers may be screen printed, such as four (4) shown in FIG. 1. One characteristic needed of a suitable based dielectric is that it be thick enough to impart the minimum required dielectric strength, typically dependent on the end use of the heater element (10).

Thus. depending on the application there may be a minimum of two dielectric layers up to for example six (6) layers depending on the application. For a non-limiting example, for automatic applications, three layers (22, 24 and 26) may be used, but four (4) layers could be used as well. On the other hand, it will be appreciated that if other deposition techniques are used that are not limited in how thick a layer can be deposited so that any desired thickness can be laid down, then in such cases there would only be a need for two layers, the base layer on the substrate (12) and topmost dielectric layer (26).

Top dielectric layer (26) will comprise a have a thermoplastic material. The melt flowable high temperature thermoplastic polymer may be selected from the group consisting of polyether ether ketone (PEEK), polyphenylene sulfide (PPS), polyphthalamide (PPA), polyarylamide (PARA), liquid crystal polymer polysulfone (PS), polyethersulfone (PES), polyphenylsulfone (PPSU), polyamide-imide (PAI), self-reinforced polyphenylene (SRP) and any combination thereof.

The additive may be any one of aluminum nitride (AlN), boron nitride (BN), titanium nitride (TiN), silicon nitride ($Si_3N_4$), aluminum oxynitride and any combination thereof.

In a preferred embodiment, after curing, the top most dielectric layer (26) is comprised primarily of alumina from about 15 to about 85 wt. % and with lesser amounts of PEEK from about 15 to about 85 wt. % and AlN from about 0.50 to about 50 wt. %. For example, if a layer is to have a preselected amount of inorganic filler (e.g., AlN) from the range of 0.50 to 50 wt. % and a preselected amount of melt-flowable thermoplastic polymer (e.g., PEEK) from the range of 15 to 85 wt. %, then the amount of inorganic filler particles (e.g., alumina) from the range of 15 to 85 wt. % is selected so the three constituents add up to 100%. This reasoning applies to all the various embodiments disclosed herein.

More preferably, after curing, the top most dielectric layer (26) is comprised primarily of alumina (from about 50 to about 70 wt. %) and with lesser amounts of PEEK (from about 25 to from about 35 wt. %) and AlN (from about 1 to from about 20 wt. %).

Most preferably, after curing, the top dielectric layer (26) is comprised primarily of α-alumina (about 58.5 wt. %) and with lesser amounts of PEEK (about 31.5 wt. %) and AlN (about 10 wt. %).

The melt flowable high temperature thermoplastic polymer used in the screen printable base dielectric (SPBD) layers (20, 22, 24) may be selected from the group consisting of polyether ether ketone (PEEK), polyphenylene sulfide (PPS), polyphthalamide (PPA), polyarylamide (PARA), liquid crystal polymer polysulfone (PS), polyethersulfone (PES), polyphenylsulfone (PPSU), polyamide-imide (PAI), self-reinforced polyphenylene (SRP) and any combination thereof. The ceramic material used in the SPBD layers (20, 22, 24) may be comprised of alumina, silica, zirconia, titania, ceria and any combination thereof (as described in Olding and Ruggiero, U.S. Pat. No. 8,653,423 B2 "Thick Film High Temperature Thermoplastic Insulated Heating Element" priority date Mar. 22, 2008; and T. R. Olding and Ruggerio, "Thick Film High Temperature Thermoplastic Insulated Heating Element", EP 3457813A1 (2009) priority date 22 Apr. 2008); which patent documents for the purposes of the US national phase application originating from this international PCT application are incorporated herein by reference in their entirety.

In preferred embodiments SPBD base layers (20, 22, 24) below topmost dielectric layer (26) comprise a combination of polyether ether ketone (PEEK) and polyamide-imide (PAI) and alumina ($Al_2O_3$). The PAI constituent may be present in a range from about 0.01 to about 2 wt. %, the PEEK constituent may be present in a range from about 30 to about 99.9 wt. % and the $Al_2O_3$ constituent may be present in a range from about 0.1 to about 75 wt. %. More preferably, the PAI constituent may be present in a range from about 0.13 to about 1 wt. %, the PEEK constituent may be present in a range from about 50 to 95 wt. % and the $Al_2O_3$ constituent may be present in a range from about from 7 to 60%. Most preferably, the PAI constituent may be present in a range from about 0.2 to about 0.6 wt. %, the PEEK constituent may be present in a range from about 80 to about 90 wt. % and the $Al_2O_3$ constituent may be present in a range from about 10 to about 15 wt. %.

In regards to the alumina filler used in the dielectric layers, the present formulation uses α-alumina ($\alpha$-$Al_2O_3$). However, those skilled in the art will appreciate that other polymorphs of alumina can be used. There are thirteen (13) known polymorphs of alumina. In particular, the present inventors contemplate that gamma alumina may be useful due to the increase in porosity afforded by its crystal structure.

Based on published characteristics by vendors (Nanoshel) the AlN characteristics are believed to have the following properties:

Particle size=<10 μm (micrometers)
Shape=Half spherical
Hardness=1100 kg/mm$^2$ (kilograms/milimeter$^2$)
Fracture toughness KIC=2.6 MPa·m$^{1/2}$
Compressive strength=2100 MPa (Mega Pascals)
Elastic modulus=330 GPa (Giga Pascals)
Flexural strength=320 MPa (Mega Pascals)
Thermal conductivity=140-180 W/m·K (Watt per meter by Kelvin)
Coefficient of thermal expansion (CTE)=4.5 ($10^{-6°}$ C.$^{-1}$)
Dielectric strength=17 volts/mil where a mil is equal to 1/1000 inches.

In all embodiments the dielectric base layers are preferably screen printed onto the metal substrate using precursor formulations containing the inorganic filler particles, the one or more melt-flowable thermoplastic polymers, and the topmost dielectric layer is preferably screen printed on top of the uppermost dielectric layer using precursor formulations containing the inorganic filler particles, the inorganic additive particles, and the one or more melt-flowable thermoplastic polymers, wherein all of the precursor formulations are formulated to be screen printed.

All of the formulations can be formulated to be screen printed by including viscosity enhancers, non limiting examples being ethyl cellulose, methyl cellulose and propyl cellulose. These viscosity enhancers will burn off during curing so that they do not appear in the final dielectric structures.

The process for producing thick film resistive heaters on metal substrates having a crack resistant top dielectric layer will be illustrated with the following non-limiting and exemplary examples.

EXAMPLES

Example 1

Four (4) layers of screen printable base dielectric (SPBD) 16 were applied to a 3000 series aluminum heat exchanger substrate (12). The four SPBD layers all had the same composition are were comprised of about 13.34 wt. % $Al_2O_3$, 0.40 wt. % PAI and about 86.26 wt. % PEEK and the total thickness of the four (4) layers was approximately 260 μm thick. Resistor layer (18) and conductor traces (28) for the circuit design, as well as a protective finish coat (40) were subsequently screen printed and cured. Standard resistor layer (18) is the same as disclosed in Olding and Ruggiero, U.S. Pat. No. 8,653,423 B2.

Figure 2:
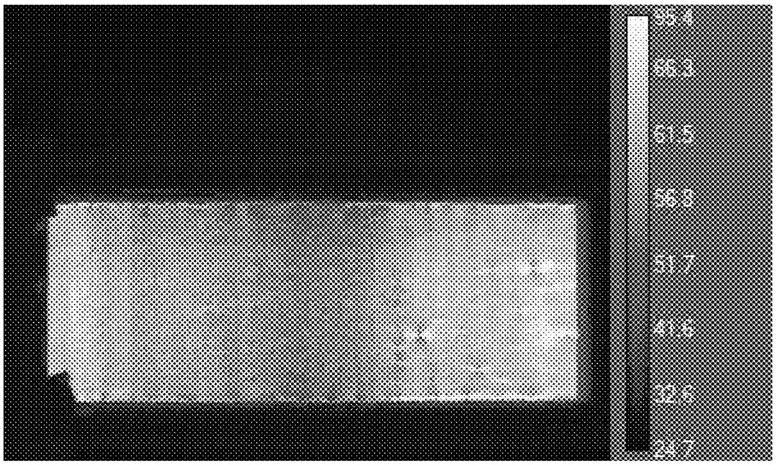
FIG. 2 Illustrates the thermal image obtained when a resistive thick film heater comprised of four (4) layers of screen printable base dielectric (SPBD) applied to a 3000 series aluminum heat exchanger substrate was energized

The resulting heater device was then subjected to routine quality assurance test protocols including a power test whereby the heater (10) was energized at a relatively low voltage (170 V for 1 seconds resulting in a current intensity of about 6.6 A) and a thermal image obtained for visual examination of defects. The results of the thermal image analysis in FIG. 2 shows that the resulting-heater was replete with hotspots due to microcracking as well as large cracks due to the fact that all the four (4) dielectric layers had the same composition so that the topmost dielectric layer did not behave as a transition layer between the resistor layer and the underlying other three base dielectric layers.

Example 2

Three (3) layers of SPBD were deposited on a heat exchanger substrate (12) made of 3000 series aluminum alloy as per Example 1 having the same composition of the four (4) base layers as in Example 1. A fourth top layer (top dielectric layer (26)) having a composition different from the three (3) SPBD layers was sprayed onto the top surface of top base layer and cured. The sprayable top dielectric layer (26) was comprised of about 65 wt. % $Al_2O_3$ and about 35 wt. % PEEK.

Figure 3:
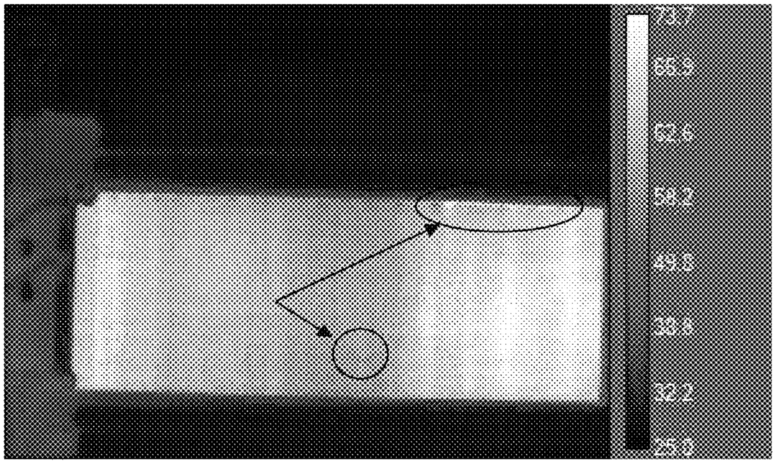
FIG. 3 illustrates the thermal image obtained from an energized resistive thick film heater comprised of three (3) layers of screen printable base dielectric (SPBD) applied to a 3000 series aluminum heat exchanger substrate and having a $4^{th}$ layer of a sprayable top dielectric deposited on top of the SPBD layers prior to deposition of the resistor layer.

The resister layer (18) and conductor traces (28) and protective finish coat (40) were subsequently screen printed and cured in standard manner. The device was subjected to a power test and visual inspection of the thermal image as described in Example 1, with a voltage of 170V for 1 second resulting in a current intensity of about 9.7 A. The results in FIG. 3 demonstrate an improvement over the case in Example 1. However, the device is of unacceptable quality with significant hot spots due to microcracking which will result in pre-mature failure of the heater.

This sprayable top dielectric formulation proved inadequate as it did not include the AlN constituent in the appropriate proportions with alumina and PEEK and while some improvement was observed by increasing the proportion of inorganic filler to thermoplastic, this however did not satisfactorily solve the problem of microcracking and hot spots Further this top dielectric formulation is not a screen printable formulation.

Example 3

Figure 4:
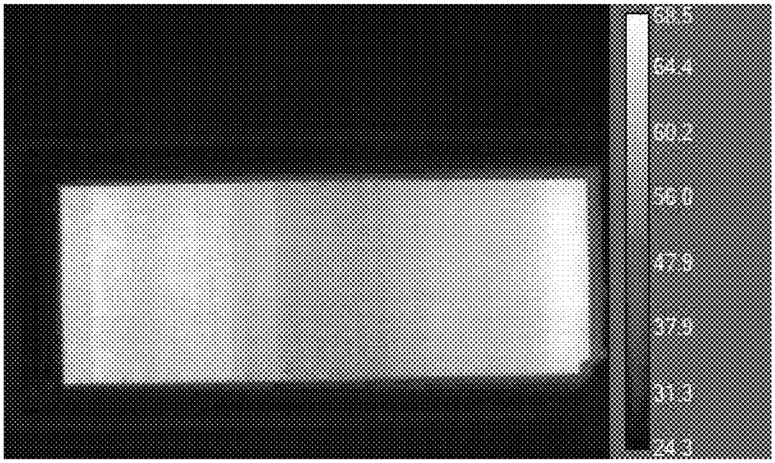
FIG. 4 illustrates the thermal image obtained from an energized resistive thick film heater comprised of three (3) layers of screen printable base dielectric (SPBD) applied to a 3000 series aluminum heat exchanger substrate and having a $4^{th}$ layer of a screen printable top dielectric containing a ternary mixture of AlN, $Al_2O_3$ and PEEK deposited on top of the SPBD layers prior to deposition of the resistor layer.

Three (3) layers of SPBD were deposited on a heat exchanger substrate made of 3000 series aluminum alloy having the same composition as the SPBD BASED as in Example 1. A fourth screen-printable top dielectric layer (26) was formulated to be hard and resilient thereby protecting the resistor layer (18). In particular, AlN was included in the formulation of this top layer (26) in about 10 wt. % with about 31.5 wt. % PEEK and about 58.5 wt. % $Al_2O_3$. The fourth topmost dielectric layer (26) was screen printed onto the top surface of layer (24) and cured. The conductors (28) and resistor layer (18) as well as a protective finish coat (40) were subsequently screen printed and cured in standard manner. The resulting heater was subjected to a power test and thermal image analysis as in Examples 1 and 2, with a voltage of 170 V for 1 second resulting in a current intensity of 8.3 Amperes (A). The results shown in FIG. 4 demonstrate improvement in thermal uniformity and demonstrated the resulting heater did not exhibit microcracking or hot spots associated with microcracking.

Example 4

Referring to FIG. 1, a thick film high voltage heater was screen printed directly onto a heat exchanger substrate (12) made of 3000 series aluminum alloy. The construction included the four (4) SPBD layers (20, 22, 24 and 26) which were comprised of about 13.34 wt. % $Al_2O_3$, 0.40 wt. % PAI and about 86.26 wt. % PEEK and with the totality of the four dielectric layers (20, 22, 24 and 26) being approximately 260 μm thick. The construction was completed per design specification with the resistor layer (18), conductor trace (28) and a finish coat or layer was screen printed on top of the dielectric layers (20, 22, 24 and 26). The protective finish coat was comprised of PEEK and $Al_2O_3$ 44.4% PEEK and 65.6% $Al_2O_3$). There was no AlN in the finish coat. The high voltage heater was subjected to a lifecycle test, whereby coolant was passed through the heat exchanger, acting as a heat sink. The heater (10) was subjected to repeated power and thermal cycling whereby the heater (10) was energized and the power cycled with the heater on for 10 seconds and off for seconds. The power voltage was adjusted to give a power of about 45 W/cm$^2$ and a surface temperature of about 189 Celsius. The experiment was monitored until the heater (10) failed, which occurred after 26,540 cycles.

Example 5

The life cycling test as described in Example 4 was repeated. However, the high voltage thick film heater (10) was comprised of three (3) layers of screen-printed base dielectric layers (20, 22 and 24).

The fourth topmost screen-printed dielectric layer (26) was comprised of about 60 wt. % $Al_2O_3$, about 35 wt. % PEEK and about 5 wt. % AlN. The heater (10) was subjected to repeated power and thermal cycling whereby the heater (10) was energized and the power cycled with the heater (10) on for 10 seconds and off for 30 seconds. The voltage was adjusted to give a power of about 4 kW and a surface temperature around 160° C. The experiment was monitored and the heater (10) did not fail after completing 180,333 cycles. At this point, the power was increased and the surface temperature increased to about 186° C. The device was power cycled for an additional 25,432 cycles and the heater (10) did not fail. The power was then increased to 5 kW and the resultant surface temperature increased to about 204° C. The experiment was then continued for an additional 5,105 cycles before the experiment was terminated without failure of the heater (10). In total, the heater (10) completed 210,870 cycles without failure.

In conclusion, the present disclosure provides a thick film heating element comprised of one or more screen printed base dielectric layers to create a base dielectric film, upon which a protective top dielectric layer is printed which serves to protect an adjacent resistive heating element screen printed on top of the top dielectric layer. The conductor traces are screen printed on top of the top dielectric layer and are in contact with the resistor layer. A protective top coat is optionally printed on top of the resistive layer and conductor traces.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES CITED

[1] Olding and Ruggiero, U.S. Pat. No. 8,653,423 B2 "Thick Film High Temperature Thermoplastic Insulated Heating Element" priority date Mar. 22, 2008.

[2] T. R. Olding and Ruggerio, "Thick Film High Temperature Thermoplastic Insulated Heating Element", EP 3457813A1 (2009) priority date 22 Apr. 2008.

[3] Kohl et al., US Patent Publication No. 2019/0166653A1 "Positive Temperature Coefficient (PTC) Heater".

[4] K. Uibel et al., US Patent Publication No. 2016/0122502 "Component parts produced by thermoplastic processing of polymer/boron nitride compounds, polymer/boron nitride compounds for producing such component parts and use thereof".

[5] D. L. Brittingham et al., US Patent Publication No. US2008/0166563A1 "Electrothermal heater made from thermally conducting electrically insulating polymer material".

[6] Y. Saga et al., US Patent Publication No. 2018/0230290A1 "Thermally Conductive Polymer Composition".

[7] Agapov et al., US Patent Publication No. 2019/0136109, "Dielectric Layer with Improved Thermal Conductivity".

[8] Chandrashekar et al., US Patent Publication No. 2014/0080951 "Thermally conductive plastic compositions, extrusion apparatus and methods for making thermally conductive pastes".

[9] Q Tan et al. US Patent Publication No. 2007/0108490A1 "Film capacitors with improved dielectric properties".

Therefore what is claimed is:

1. A thick film thermoplastic insulated resistive heating element, comprising:

a metallic substrate upon which one or more base dielectric layers are located and a topmost dielectric layer located on an uppermost base dielectric layer of the one or more base dielectric layers to produce a multilayer dielectric film;

said one or more base dielectric layers comprising a combination of one or more melt flowable high temperature thermoplastic polymers, and inorganic filler particles, said one or more melt flowable high temperature thermoplastic polymers present in a range from about 25% to about 99.9%, and said inorganic filler particles present in a range from about 0.10 to about 75 wt. %;

a resistor layer on top of the topmost dielectric layer and spaced apart electrical traces located on top of the resistor layer to allow a power source to be connected between said resistor layer and said metallic substrate to apply power to the resistor layer; and said top most dielectric layer being formulated to mitigate or obviate microcracking in the resistor layer, and comprising inorganic filler particles present in a range from about 15 to about 85 wt. %, melt flowable high temperature thermoplastic polymer present in a range from about 15 to about 85 wt. %, and inorganic additive particles present in a range from about 0.50 to about 50 wt. %.

2. The thick film thermoplastic insulated resistive heating element according to claim 1, wherein the inorganic additive particles are any one or combination of aluminum nitride (AlN), boron nitride (BN), titanium nitride (TiN), silicon nitride ($Si_3N_4$), aluminum oxynitride and any combination thereof.

3. The thick film thermoplastic insulated resistive heating element according to claim 1, wherein the one or more melt flowable high temperature thermoplastic polymers in the dielectric base layers and in the topmost dielectric layer are selected from the group consisting of polyether ether ketone (PEEK), polyphenylene sulfide (PPS), polyphthalamide (PPA), polyarylamide (PARA), liquid crystal polymer polysulfone (PS), polyethersulfone (PES), polyphenylsulfone (PPSU), polyamide-imide (PAI), self-reinforced polyphenylene (SRP) and any combination thereof.

4. The thick film thermoplastic insulated resistive heating element according to claim 1, wherein said inorganic filler particles are any one or combination of alumina, silica, zirconia, titania, ceria, mica, glass flakes and any combination thereof.

5. The thick film thermoplastic insulated resistive heating element according to claim 4, wherein said inorganic filler particles have a flake like or plate like aspect ratio or acicular or rod like crystal habit.

6. The thick film thermoplastic insulated resistive heating element according to claim 1, wherein the melt flowable high temperature thermoplastic polymer in the topmost dielectric layer is polyether ether ketone, the inorganic additive particles are aluminum nitride and the inorganic filler particles are alumina particles, and wherein the topmost dielectric layer comprises the alumina particles present in a range from about 50 to about 70 wt. %, the polyether ether ketone present in a range from about 25 to about 35 wt. %, and the inorganic additive particles are aluminum nitride particles present in a range from about 1 to about 20 wt. %.

7. The thick film thermoplastic insulated resistive heating element according to claim 6, wherein said topmost dielectric layer comprises said alumina particles present in an amount of about 58.5 wt. %, the melt flowable high temperature thermoplastic polymer being polyether ether ketone present in an amount of about 31.5 wt. %, and the aluminum nitride particles present in an amount of about 10 wt. %.

8. The thick film thermoplastic insulated resistive heating element according to claim 1, wherein said one or more melt flowable high temperature thermoplastic polymers in said one or more base dielectric layers is a combination of polyether ether ketone and polyamide-imide, and wherein the inorganic filler particles are alumina particles, and wherein said one or more base dielectric layers comprises said polyether ether ketone is present in a range from about 30 to about 99.9 wt. % and said polyamide-imide present in a range from about 0.01 to about 2 wt. %, and the remainder being alumina particles to make up to 100%.

9. The thick film thermoplastic insulated resistive heating element according to claim 1, wherein said one or more melt flowable high temperature thermoplastic polymers in said one or more base dielectric layers is a combination of polyether ether ketone and polyamide-imide, and wherein the inorganic filler particles are alumina particles, and wherein said one or more base dielectric layers comprises said polyether ether ketone is present in a range from about 30 to about 99.9 wt. % and said polyamide-imide present in a range from about 0.01 to about 2 wt. %, and the alumina particles present in a range from about 0.10 to about 75 wt %.

10. The thick film thermoplastic insulated resistive heating element according to claim 1, wherein said one or more melt flowable high temperature thermoplastic polymers in said one or more base dielectric layers is a combination of polyether ether ketone and polyamide-imide, and wherein the inorganic filler particles are alumina particles, wherein the polyether ether ketone is present in a range from about 50 to 95 wt. %, and wherein said polyamide-imide present in a range from about 0.13 to about 1 wt. %, and the remainder being said alumina particles.

11. The thick film thermoplastic insulated resistive heating element according to claim 1, wherein said one or more melt flowable high temperature thermoplastic polymers in said one or more base dielectric layers is a combination of polyether ether ketone and polyamide-imide, and wherein the inorganic filler particles are alumina particles, wherein the melt flowable high temperature thermoplastic polymer is present in a range from about 50 to 95 wt. %, and wherein said polyamide-imide present in a range from about 0.13 to about 1 wt. %, and the %, and the remainder being said alumina particles.

12. The thick film thermoplastic insulated resistive heating element according to claim 1, wherein the one or more melt flowable high temperature thermoplastic polymers in said one or more base dielectric layers is a combination of polyether ether ketone and polyamide-imide, and the inorganic filler is alumina, and wherein said one or more base dielectric layers comprise said polyether ether ketone present in a range from about 80 to 90 about wt. %, said polyamide-imide present in a range from about 0.2 to about 0.6 wt. %, and said alumina present in a range from about 10 to about 15 wt. %.

13. The thick film thermoplastic insulated resistive heating element according to claim 1, wherein the one or more melt flowable high temperature thermoplastic polymers in said one or more base dielectric layers is a combination of polyether ether ketone and polyamide-imide, and the inorganic filler is alumina, and wherein said one or more base dielectric layers comprise said polyether ether ketone present in a range from about 80 to 90 about wt. %, said polyamide-imide present in a range from about 0.2 to about 0.6 wt. %, and said alumina present in a range from about 10 to about 15 wt. %.

14. The thick film thermoplastic insulated resistive heating element according to claim 1, wherein the inorganic filler is α-alumina.

15. The thick film thermoplastic insulated resistive heating element according to claim 1, wherein said alumina is gamma alumina.

16. The thick film thermoplastic insulated resistive heating element according to claim 1, further comprising a protective top coat located on top of the resistor layer.

17. The thick film thermoplastic insulated resistive heating element according to claim 16, wherein said protective top coat layer has a composition substantially the same as the topmost dielectric layer.

18. The thick film thermoplastic insulated resistive heating element according to claim 1, wherein surfaces of said inorganic filler particles are functionalized or otherwise derivatized to improve the cohesiveness of the resulting layer.

19. The thick film thermoplastic insulated resistive heating element according to claim 1, wherein said resistor layer is an electrically resistive lead-free thick film made from a sol-gel composite.

20. The thick film thermoplastic insulated resistive heating element according to claim 19, wherein all of said formulations are formulated to be screen printed by including viscosity enhancers.

21. The thick film thermoplastic insulated resistive heating element according to claim 20, wherein viscosity enhancers include any one or combination of ethyl cellulose, methyl cellulose and propyl cellulose.

22. The thick film thermoplastic insulated resistive heating element according to claim 1, wherein all dielectric base layers are screen printed onto said metal substrate using precursor formulations containing said inorganic filler particles, and said one or more melt-flowable thermoplastic polymers, and wherein said topmost dielectric layer is screen printed onto the uppermost dielectric layer using precursor formulations containing said inorganic filler particles, said inorganic additive particles, and said one or more melt-flowable thermoplastic polymers, wherein all of said precursor formulations are formulated to be screen printed.

23. The thick film thermoplastic insulated resistive heating element according to claim 1, wherein said one or more melt flowable high temperature thermoplastic polymers in said one or more base dielectric layers comprise a combination of polyether ether ketone and polyamide-imide, and said inorganic filler particle in said one or more base dielectric layers is alumina particles, said polyether ether ketone being present in a range from about 30 to about 99.9 wt. %, said polyamide-imide being present in a range from about .01 to about 2 wt. %, and the alumina particles are present in a range from about 0.1 to about 75 wt. %; and wherein said top most dielectric layer being formulated to mitigate or obviate microcracking in the resistor layer, and includes alumina particles as said inorganic filler particles present in a range from about 15 to about 85 wt. %, polyether ether ketone as said melt flowable high temperature thermoplastic polymer present in a range from about 15 to about 85 wt. %, and aluminum nitride particles as said inorganic additive particles present in a range from about 0.50 to about 50 wt. %.

24. The thick film thermoplastic insulated resistive heating element according to claim 23, wherein said topmost dielectric layer includes said alumina particles present in a range from about 50 to about 70 wt. %, the polyether ether ketone present in a range from about 20 to about 40 wt. %, and the aluminum nitride particles present in a range from about 1 to about 20 wt. %.

25. The thick film thermoplastic insulated resistive heating element according to claim 23, wherein said topmost dielectric layer includes said alumina particles present in a range from about alumina ranges from 55 to 60 wt. %, the polyether ether ketone present in a range from about 25 to about 35 wt. %, and the aluminum nitride particles present in a range from about 5 to about 15 wt. %.

26. The thick film thermoplastic insulated resistive heating element according to claim 23, wherein said top most dielectric layer includes the alumina particles present in an amount of about 58.5 wt. %, the polyether ether ketone present in an amount of about 31.5 wt. %, and the aluminum nitride particles present in an amount of about 10 wt. %.

27. The thick film thermoplastic insulated resistive heating element according to claim 23, wherein the alumina particles are α-alumina particles.

28. The thick film thermoplastic insulated resistive heating element according to claim 23, wherein said alumina particles are gamma alumina particles.

29. The thick film thermoplastic insulated resistive heating element according to claim 23, wherein said alumina particles have any one or combination of a flake like aspect ratio, plate like aspect ratio, acicular crystal habit and rod like crystal habit.

30. The thick film thermoplastic insulated resistive heating element according to claim 23, further comprising a protective top coat located on top of the resistor layer.

31. The thick film thermoplastic insulated resistive heating element according to claim 30, wherein said protective top coat layer has a composition substantially the same as the topmost dielectric layer located directly under the resistor layer.

32. The thick film thermoplastic insulated resistive heating element according to claim 23, wherein surfaces of said alumina particles are functionalized or otherwise derivatized to improve the cohesiveness of the resulting dielectric layer.

33. The thick film thermoplastic insulated resistive heating element according to claim 23, wherein said resistor layer is an electrically resistive lead-free thick film made from a sol-gel composite.

34. The thick film thermoplastic insulated resistive heating element according to claim 23, wherein said aluminum nitride particles have a size generally less than about 10 micrometers.

35. The thick film thermoplastic insulated resistive heating element according to claim 23, wherein said alumina particles have a mean size in a range from about 5 μm to about 20 μm.

36. The thick film thermoplastic insulated resistive heating element according to claim 23, wherein said metallic substrate is any one of aluminum, stainless steel and low carbon steel.

37. The thick film thermoplastic insulated resistive heating element according to claim 23, wherein all dielectric base layers are screen printed onto said metal substrate using precursor formulations containing said alumina particles, said polyether ether ketone and said polyamide-imide, and wherein said topmost dielectric layer is screen printed onto the uppermost base dielectric layer using precursor formulations containing said alumina particles, said aluminum nitride particles and said polyether ether ketone, wherein all of said precursor formulations are formulated to be screen printed.

38. The thick film thermoplastic insulated resistive heating element according to claim 37, wherein all of said formulations are formulated to be screen printed by including viscosity enhancers.

39. The thick film thermoplastic insulated resistive heating element according to claim 38, wherein viscosity enhancers include any one or combination of ethyl cellulose, methyl cellulose and propyl cellulose.

* * * * *